US012811051B2

(12) United States Patent
Jeong et al.

(10) Patent No.: US 12,811,051 B2
(45) Date of Patent: Nov. 24, 2026

(54) ON-CHIP INDUCTOR

(71) Applicant: SAMSUNG ELECTRONICS CO., LTD., Suwon-si (KR)

(72) Inventors: Jinho Jeong, Seoul (KR); Hyungeun Kim, Seoul (KR); Heesoo Kim, Seoul (KR)

(73) Assignees: Samsung Electronics Co., Ltd., Suwon-si (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 959 days.

(21) Appl. No.: 17/983,464

(22) Filed: Nov. 9, 2022

(65) Prior Publication Data

US 2023/0148385 A1 May 11, 2023

(30) Foreign Application Priority Data

Nov. 11, 2021 (KR) ........................ 10-2021-0155014

(51) Int. Cl.
*H01F 27/28* (2006.01)
*H01F 27/30* (2006.01)
*H01F 27/32* (2006.01)

(52) U.S. Cl.
CPC ....... *H01F 27/2804* (2013.01); *H01F 27/303* (2013.01); *H01F 27/323* (2013.01); *H01F 2027/2809* (2013.01)

(58) Field of Classification Search
CPC ......... H01F 27/2804; H01F 2027/2809; H01F 17/0006; H01F 17/0013; H01F 5/003
(Continued)

(56) References Cited

U.S. PATENT DOCUMENTS 6,414,567 B2 7/2002 Matsumura et al.
7,126,451 B2 * 10/2006 Maruyama ............ H01F 41/041 336/200
(Continued)

FOREIGN PATENT DOCUMENTS

KR 101216946 B1 * 1/2013 ......... H01F 17/0013
KR 10-2015-0014390 A 2/2015
(Continued)

OTHER PUBLICATIONS

Office Action in Korean Appln. No. 10-2021-0155014, mailed on Aug. 14, 2025, 11 pages (with English translation).

*Primary Examiner* — Tszfung J Chan
(74) *Attorney, Agent, or Firm* — Fish & Richardson P.C.

(57) ABSTRACT

An on-chip inductor includes a semiconductor substrate, a plurality of insulating layers stacked over the semiconductor substrate, and first, second and third spiral-shaped coil patterns. The first, second and third spiral-shaped coil patterns are inductively coupled to each other and sequentially disposed on respective layers among the plurality of insulating layers. Further, the first, second and third spiral-shaped coil patterns have respective first ends overlapping each other. The on-chip inductor further includes a first via connecting the respective first ends of the first and second spiral-shaped coil patterns to each other, and a second via connecting the respective first ends of the second and third spiral-shaped coil patterns to each other, where the first and second vias overlap each other.

19 Claims, 8 Drawing Sheets

(58) Field of Classification Search
USPC .................................................. 336/200, 232
See application file for complete search history.

(56) References Cited

U.S. PATENT DOCUMENTS

| | | | | |
|---|---|---|---|---|
| 7,317,354 | B2 * | 1/2008 | Lee ..................... | H01F 17/0013<br>336/232 |
| 7,688,160 | B2 | 3/2010 | Liu et al. | |
| 8,519,814 | B2 | 8/2013 | Feng et al. | |
| 9,812,244 | B2 | 11/2017 | Yazaki | |
| 2012/0188671 | A1 | 7/2012 | Kireev et al. | |
| 2015/0028979 | A1 * | 1/2015 | Barry .................. | H01F 27/2804<br>336/170 |
| 2015/0028988 | A1 * | 1/2015 | Yamauchi ........... | H01F 27/2804<br>336/200 |
| 2016/0217905 | A1 | 7/2016 | Yang et al. | |
| 2017/0345548 | A1 * | 11/2017 | Yu ....................... | H01F 27/2804 |
| 2019/0074129 | A1 | 3/2019 | Fan | |
| 2019/0378640 | A1 | 12/2019 | Cheng et al. | |
| 2020/0366264 | A1 | 11/2020 | Nakashima | |

FOREIGN PATENT DOCUMENTS

| | | | | | |
|---|---|---|---|---|---|
| KR | 10-1642643 | B1 | | 7/2016 | |
| WO | WO-2015037374 | A1 | * | 3/2015 | ........... H03H 7/0115 |

* cited by examiner

ON-CHIP INDUCTOR

CROSS-REFERENCE TO RELATED APPLICATION(S)

A claim of priority is made to Korean Patent Application No. 10-2021-0155014, filed on Nov. 11, 2021, in the Korean Intellectual Property Office, the disclosure of which is incorporated herein by reference in its entirety.

BACKGROUND

The present inventive concepts relate to on-chip inductors.

An inductor is a widely implemented element in high-speed semiconductor integrated circuits, and in particular, is a key element for improving bandwidth. Generally, an on-chip inductor is configured as a spiral metal pattern. In order to obtain a high inductance, a number of turns of the spiral metal pattern may be increased. However, this disadvantageously increases an occupation area of the inductor within the semiconductor chip.

SUMMARY

According to an aspect of the present inventive concepts, an on-chip inductor is provided which includes a semiconductor substrate, a plurality of insulating layers stacked over the semiconductor substrate, and first, second and third spiral-shaped coil patterns inductively coupled to each other and sequentially disposed on respective layers among the plurality of insulating layers. The first, second and third spiral-shaped coil patterns have respective first ends overlapping each other. The on-chip inductor further includes a first via connecting the respective first ends of the first and second spiral-shaped coil patterns to each other, and a second via connecting the respective first ends of the second and third spiral-shaped coil patterns to each other, where the first and second vias overlap each other.

According to an aspect of the present inventive concepts, an on-chip inductor is provided which includes a plurality of insulating layers, and at least three spiral-shaped coil patterns inductively coupled to each other and respectively disposed on the plurality of insulating layers. The at least three spiral-shaped coil patterns have respective first ends aligned with each other in a vertical direction. The on-chip inductor further includes vias penetrating through at least one insulating layer among the plurality of insulating layers to connect the respective first ends of the at least three spiral-shaped coil patterns and disposed to overlap each other.

According to an aspect of the present inventive concepts, an on-chip inductor is provided which includes a semiconductor substrate, a multilayer interconnection layer stacked on the semiconductor substrate in one direction, and first, second and third spiral-shaped coil patterns inductively coupled to each other and sequentially disposed on respective layers of the multilayer interconnection layer. The first, second and third spiral-shaped coil patterns have respective first ends overlapping in the one direction. The on-chip inductor further includes a first via connecting the respective first ends of the first and second spiral-shaped coil patterns to each other, and a second via connecting the respective first ends of the second and third spiral-shaped coil patterns to each other. The first and second vias are disposed to overlap in the one direction, and form a common node electrically connecting the respective first ends of the first to third spiral-shaped coil patterns in common.

BRIEF DESCRIPTION OF DRAWINGS

The above and other aspects, features, and advantages of the present inventive concepts will become readily apparent from the following detailed description that follows, taken in conjunction with the accompanying drawings, in which.

DETAILED DESCRIPTION

Hereinafter, example embodiments of the present inventive concepts will be described with reference to the accompanying drawings.

Figure 1:
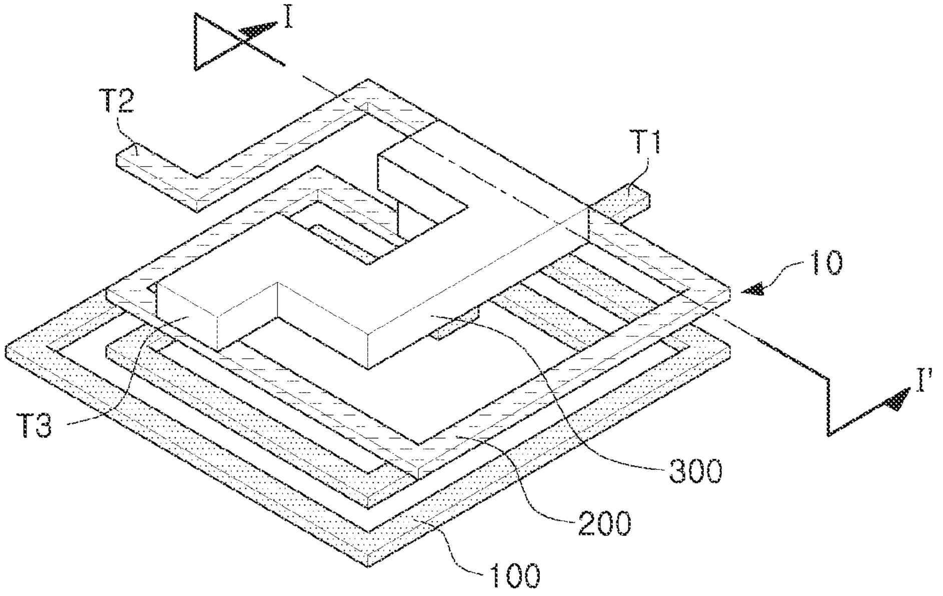
FIG. 1 is a perspective view of an on-chip inductor according to an example embodiment of the present inventive concepts.

An on-chip inductor according to an example embodiment of the present inventive concepts will be described with reference to FIGS. 1 to 3. FIG. 1 is a perspective view of an on-chip inductor according to an example embodiment of the present inventive concepts, FIG. 2 is an exploded perspective view of the on-chip inductor illustrated in FIG. 1, and FIG. 3 is a cross-sectional view taken along line I-I' of FIG. 1.

Figure 2:
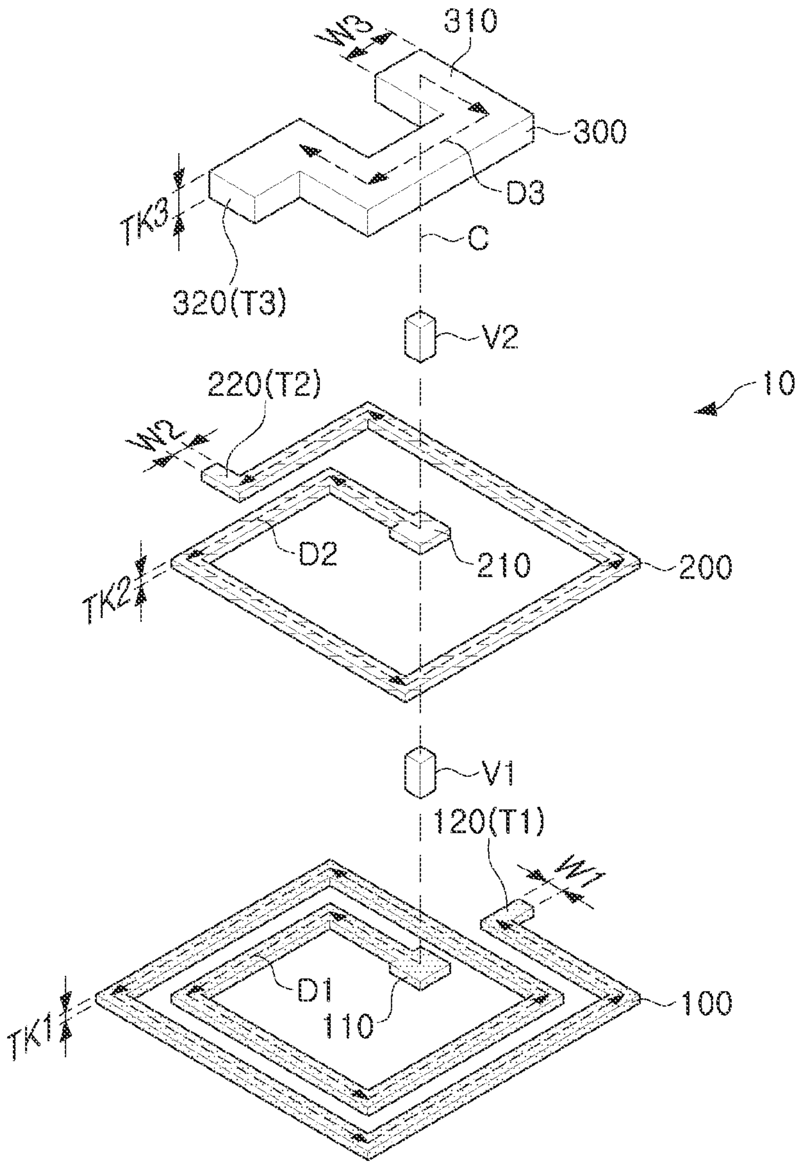
FIG. 2 is an exploded perspective view of the on-chip inductor illustrated in FIG. 1.
Figure 3:
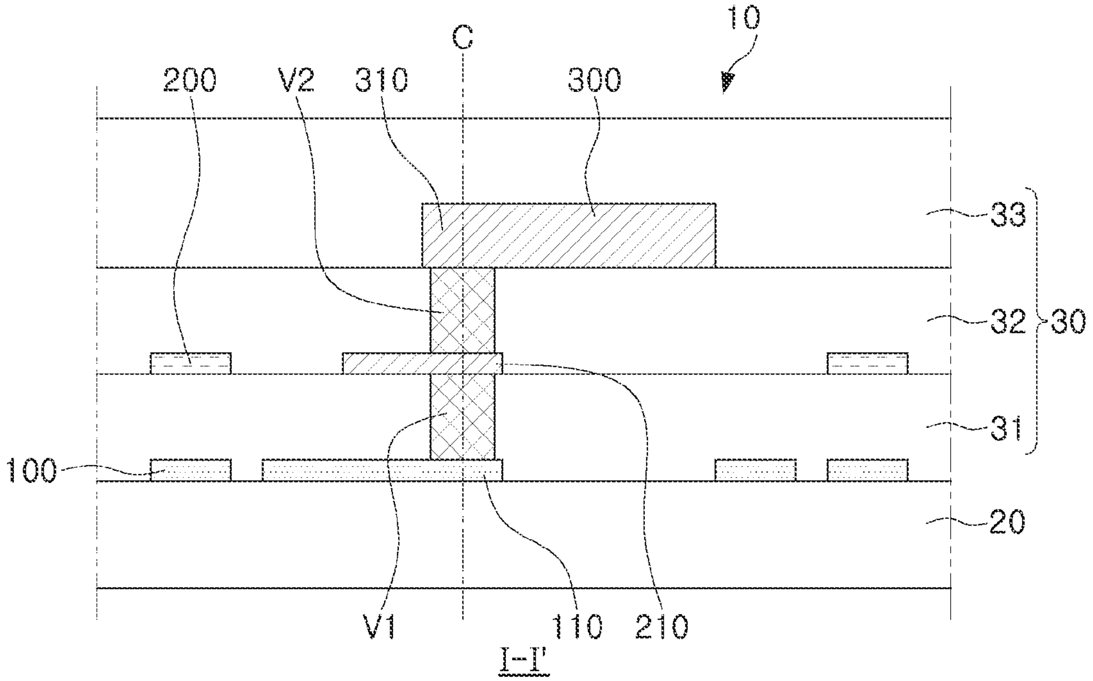
FIG. 3 is a cross-sectional view taken along line I-I' of FIG. 1.

Referring collectively to FIGS. 1 to 3, an on-chip inductor 10 may include a semiconductor substrate 20, insulating layers 30, first to third coil patterns 100, 200, and 300, and first and second vias V1 and V2. In this example, a case is described in which three coil patterns and two vias are employed, but the present inventive concepts are not limited thereto. For example, four or more coil patterns and three or more vias may be employed in other embodiments of the inventive concepts.

Referring to FIG. 3, the semiconductor substrate 20 may be a silicon on insulator (SOI) wafer, and insulating layers 30 may be stacked on an upper surface of the semiconductor substrate 20. The insulating layers 30 may be formed of an insulating material. For example, the insulating layer 111 may include at least one of $SiO_2$, SiN, and SiCN.

Each of the first to third coil patterns 100, 200, and 300 may form an inductor. For example, each of the first to third coil patterns 100, 200 and 300 may form first to third inductors. Each of the first to third coil patterns 100, 200, and 300 may be a spiral inductor in which patterns made of a metal material are disposed in a spiral shape on a plane. The metal material may include at least one of aluminum (Al), titanium (Ti), and titanium nitride (TiN). Each of the first to third coil patterns 100, 200, and 300 is illustrated in the present example embodiment as having a rectangular spiral shape. However, the inventive concepts are not limited in this manner, and other various spiral shapes such as circular and octagonal shapes may be implemented in other example embodiments. Respective one ends 110, 210, and 310 of the first to third coil patterns 100, 200, and 300 may be used as lands for connecting vias. The first to third coil patterns 100, 200, and 300 may be formed in a spiral shape extending outwardly from the respective one ends 110, 210, and 310 of the first to third coil patterns 100, 200, and 300 as a center C. The other ends 120, 220, and 320 of each of the first to third coil patterns 100, 200, and 300 may be used as a terminal (i.e., T1, T2 and T3) for inputting a signal. The first to third coil patterns 100, 200, and 300 may be formed in a form of thin films on an upper surface of the semiconductor substrate 20 and/or upper surfaces of the insulating layers 30.

The first to third coil patterns 100, 200, and 300 may be disposed on the multilayer insulating layers 30 to be spaced apart from each other, respectively. For example, the first coil pattern 100 disposed in a lowermost portion thereof may be stacked on the upper surface of the semiconductor substrate 20, and the first insulating layer 31 may cover the first coil pattern 100.

The second and third coil patterns 200, 300 disposed above the first coil pattern 100 may be stacked on the first and second insulating layers 31 and 32, respectively. However, the present inventive concepts are not limited to a single insulating layer between coil patterns, and instead a plurality of insulating layers may be disposed between the respective coil patterns. In other words, the insulating layers 31, 32 and 33 may single layer structures, multilayer structures or a combination of single layer and multilayer structures.

Each of the first to third coil patterns 100, 200 and 300 includes opposite first and second ends. In addition, the first ends 110, 210, and 310 of the first to third coil patterns 100, 200, and 300 may be connected to each other by first and second vias V1 and V2 penetrating through the insulating layers 30. For example, the first via V1 may connect first end 110 of the first coil pattern 100 and first end 210 of the second coil pattern 200 to each other, and the second via V2 may connect first end 210 of the second coil pattern 200 and one end 310 of the third coil pattern 300 to each other. In the illustrated example embodiment, the first and second vias V1 and V2 are formed in a rectangular column shape. However, the inventive concepts are not limited in this manner, and as an example, the first and second vias V1 and V2 may be formed in a cylindrical column shape. In addition, side surfaces of the first and second vias V1 and V2 may be formed to be perpendicular to the upper surface of the semiconductor substrate 20, but the present inventive concepts are not limited thereto. For example, the side surfaces of the first and second vias V1 and V2 may be formed as an inclined surface.

In the illustrated example embodiment, a case in which a line width W3 and a thickness TK3 of the third coil pattern 300 disposed in an uppermost portion thereof are greater than a line width W1 and a thickness TK1 of the first coil pattern 100 is illustrated as an example, but an example embodiment thereof is not limited thereto. The line widths W1, W2, and W3 and the thicknesses TK1, TK2, and TK3 of each of the first to third coil patterns 100, 200, and 300 may be variously modified according to a self inductance value of the on-chip inductor 10 to be implemented.

The first to third coil patterns 100, 200, and 300 may be disposed to vertically overlap the insulating layers 30, respectively. An area of a region in which the first to third coil patterns 100, 200, and 300 overlap each other may vary according to a mutual inductance value of the on-chip inductor 10 to be implemented.

Accordingly, a self-inductance value of the on-chip inductor 10 may be adjusted by adjusting a shape of the first to third coil patterns 100, 200, and 300 included in the on-chip inductor 10. Further, by adjusting disposition between the first to third coil patterns 100, 200, and 300 and a direction of a spiral, a mutual inductance value may be adjusted. That is, the on-chip inductor 10 according to an example embodiment may adjust the mutual inductance value by varying a size of a region in which the first to third coil patterns 100, 200, and 300 overlap each other. In addition, the on-chip inductor 10 according to an example embodiment may adjust mutual inductance by changing a rotation direction of each of the first to third coil patterns 100, 200, and 300. As described above, the on-chip inductor 10 according to an example embodiment may be configured to obtain desired electrical characteristics by adjusting the shape and disposition of the first to third coil patterns 100, 200, and 300.

Figure 4A:
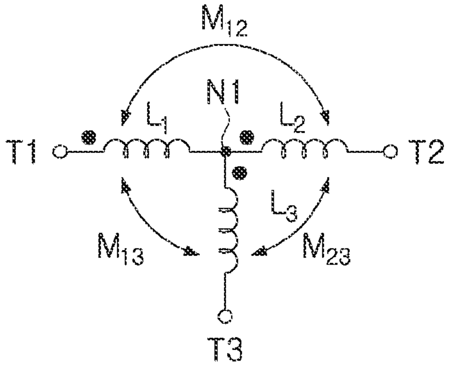
FIGS. 4A and 4B are equivalent circuit diagrams of the on-chip inductor of FIG. 1.

The on-chip inductor 10 of FIGS. 1 through 3 can be represented by the equivalent circuit illustrated in FIG. 4A. As shown in FIG. 4A, first to third inductors having self-inductances of L1, L2, and L2, respectively, are connected to the common node N1 in a T-type configuration, and the first to third inductors can be represented by a circuit inductively coupled to each other with mutual inductances of $M_{12}$, $M_{23}$, and $M_{32}$. In this case, according to positions of the illustrated dots of the first to third inductors connected to the common node N1, a rotation direction of the first to third coil patterns 100 and 200 included in the on-chip inductor 10 of FIG. 1 may be determined. Referring to FIG. 4A, it can be seen that a position of a dot of the first inductor has a direction opposite to the common node N1, and positions of dots of second and third inductors has a direction toward the common node N1.

Figure 4B:
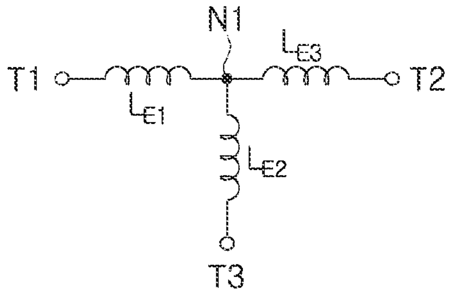

A circuit of FIG. 4A may be represented by an equivalent circuit of FIG. 4B. A equivalent inductance ($L_{E1}$) of the first inductor may be represented by $L_1+M_{12}+M_{23}+M_{31}$, a equivalent inductance ($L_{E2}$) of the second inductor may be represented by $L_2+M_{12}+M_{23}-M_{31}$, and a equivalent inductance ($L_{E3}$) may be represented by $L_3-M_{12}+M_{23}+M_{31}$.

Figure 5A:
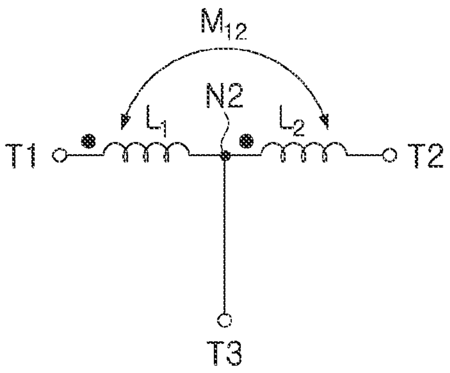
FIGS. 5A and 5B are equivalent circuit diagrams of a Comparative example.
Figure 5B:
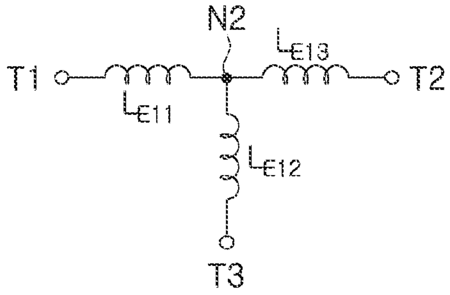

On the other hand, as illustrated in FIG. 5A, when an inductor is not disposed on a second terminal T2, represented by an equivalent circuit of FIG. 5B, a equivalent inductance ($L_{E11}$) of the first inductor may be represented by $L_1+M_{12}$, a equivalent inductance ($L_{E12}$) of the second inductor may be represented by $L_2+M_{12}$, and a equivalent inductance ($L_{E13}$) of the third inductor may be represented by $-M_{12}$. In the case of FIG. 5A, an inductor is not disposed on a second terminal T2, and thus an overall inductance value is lower than that of FIG. 4A. Accordingly, the on-chip inductor 10 of an example embodiment configured with the equivalent circuit of FIG. 4A may have a higher equivalent inductance value in a relatively narrow area, compared to the on-chip inductor configured with the equivalent circuit of FIG. 5A.

Figure 6:
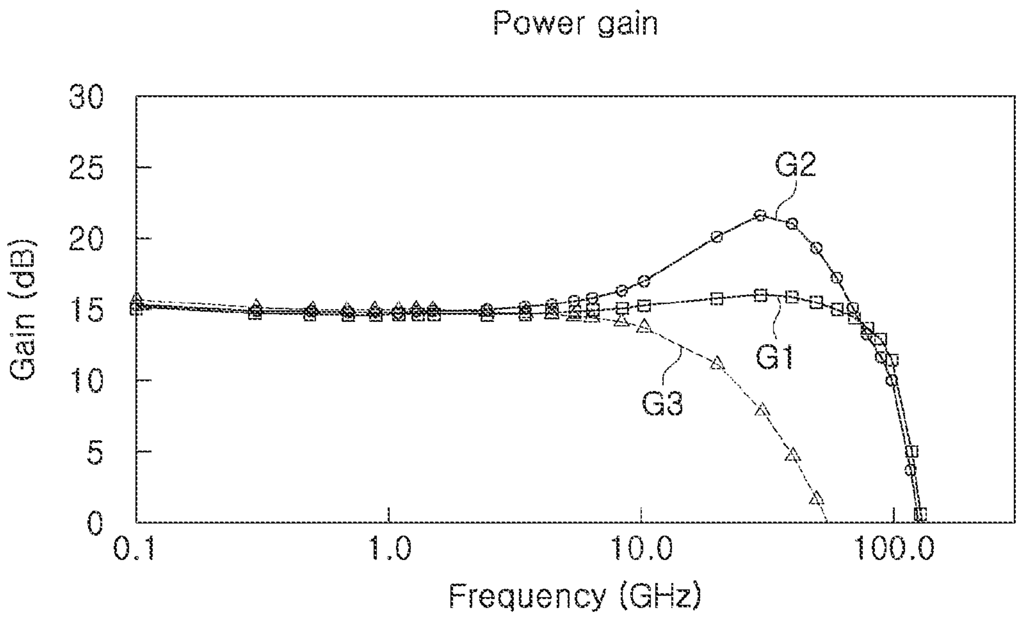
FIG. 6 is a graph comparing power gains of an Example and Comparative examples.

FIG. 6 is a graph comparing power gains of an Example and Comparative examples.

G1 is a power gain graph according to an Example, illustrating a power gain of an amplifying circuit employing the on-chip inductor of FIG. 1. G2 is a power gain graph of a Comparative Example 1, illustrating a power gain of an amplifying circuit employing the on-chip inductor illustrated in FIG. 5A. G3 is a power gain graph of a Comparative Example 3, illustrating a power gain of an amplifying circuit configured only with an RC circuit without an on-chip inductor.

In the case of an Example, as compared to a Comparative Example 1, it can be seen that peaking of the power gain is greatly reduced, so that gain flatness is improved. In addition, it can be seen that a power gain in a high frequency band is increased in an Example compared to a Comparative Example 2. Accordingly, in the case of an Example, it can be seen that bandwidth characteristics are improved compared to Comparative Examples 1 and 2.

Figure 7:
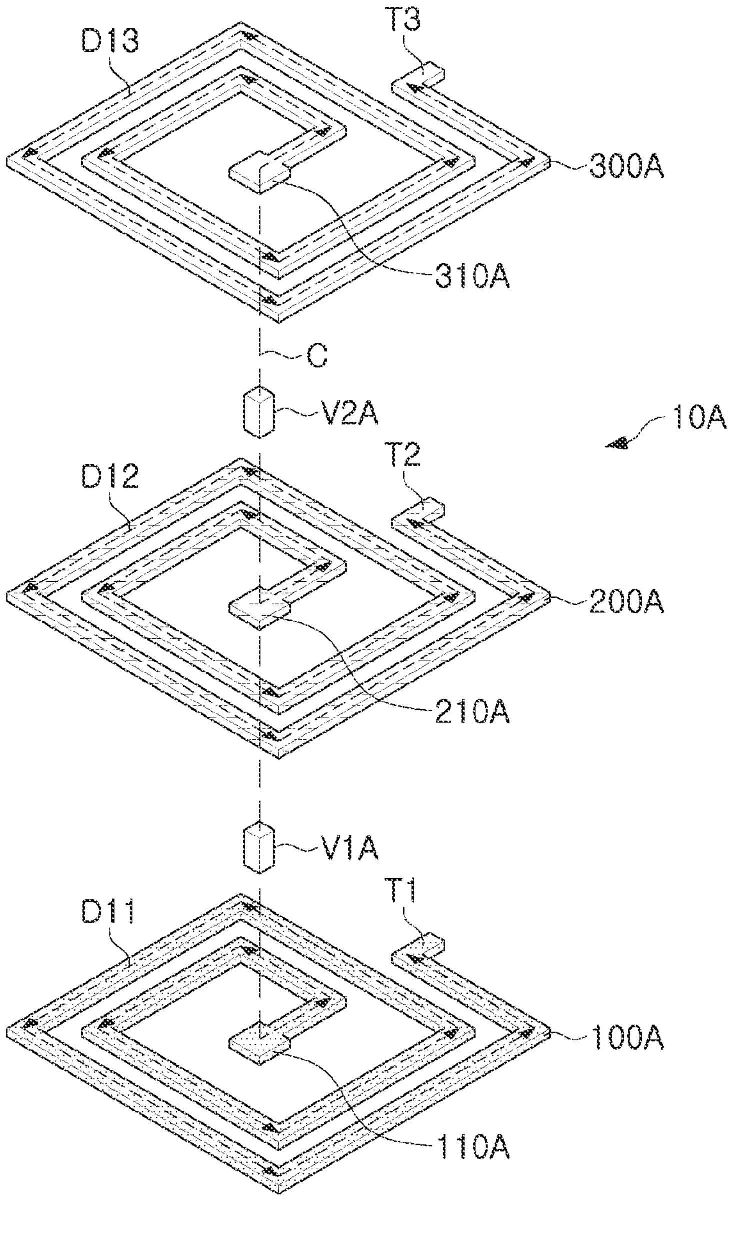
FIG. 7 is a perspective view of an on-chip inductor according to another example embodiment of the present inventive concepts.
Figure 8A:
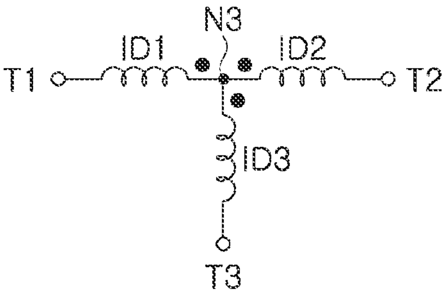
FIGS. 8A and 8B are equivalent circuit diagrams of the on-chip inductor of FIG. 7.
Figure 8B:
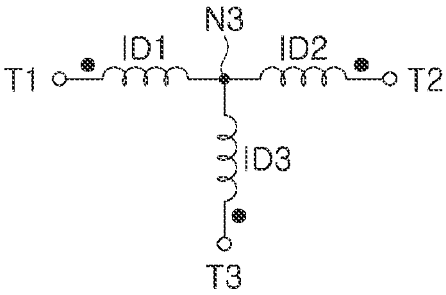
Figure 9:
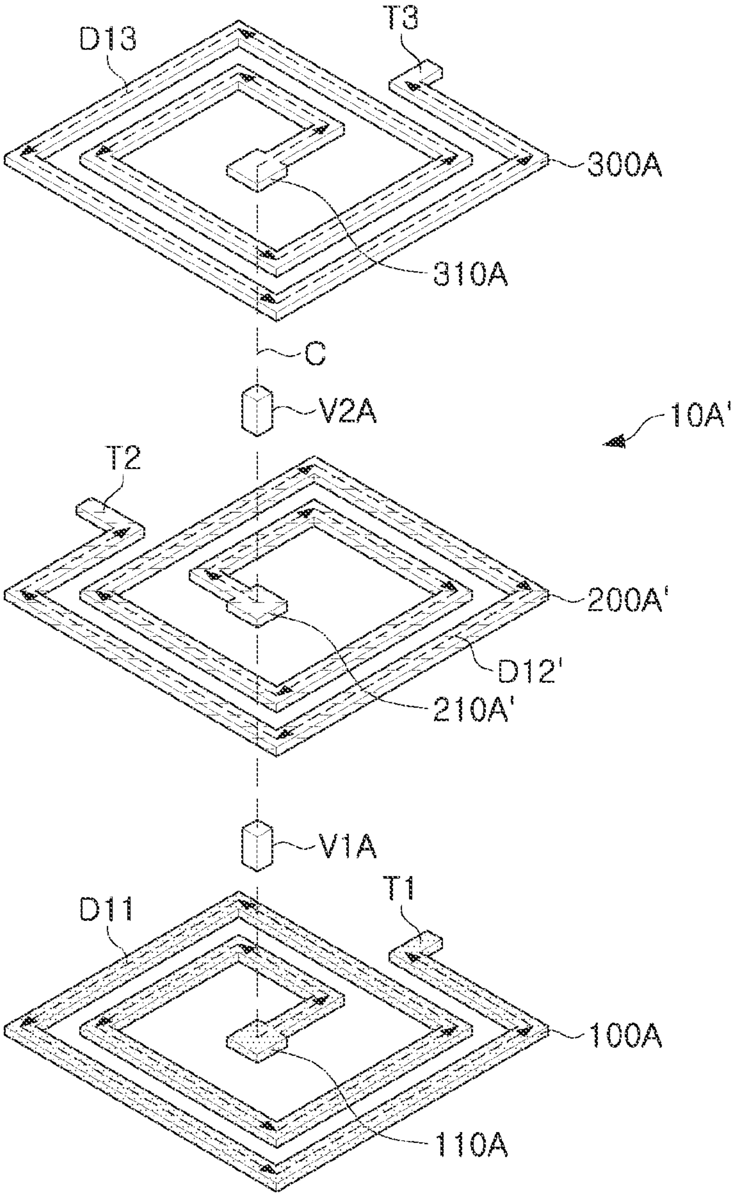
FIG. 9 illustrates a modified example of the on-chip inductor of FIG. 7.
Figure 10A:
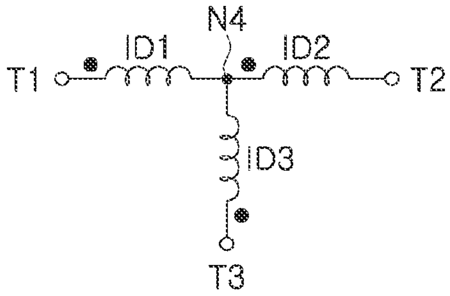
FIGS. 10A and 10B are equivalent circuit diagrams of the on-chip inductor of FIG. 9.
Figure 10B:
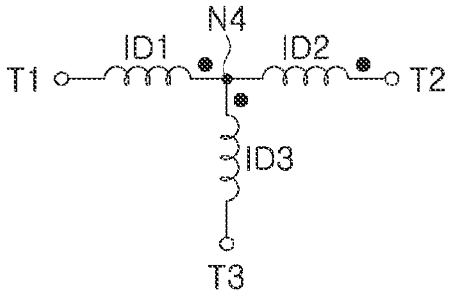

A relationship between a rotation direction of coil patterns included in an on-chip inductor and a mutual inductance will be described with reference to FIGS. 7 to 10. FIG. 7 is a perspective view of an on-chip inductor according to an example embodiment of the present inventive concepts, and FIGS. 8A and 8B are equivalent circuit diagrams of the on-chip inductor of FIG. 7. FIG. 9 is a perspective view of an on-chip inductor according to an example embodiment of the present inventive concepts, and FIGS. 10A and 10B are equivalent circuit diagrams of the on-chip inductor of FIG. 7.

Referring to FIG. 7, in an on-chip inductor 10A according to an example embodiment, first to third coil patterns 100A, 200A, and 300A have the same rotation directions D11, D12, and D13. In an example embodiment, similar to the example embodiment described above, a first via VIA may connect one end 110A of the first coil pattern 100A and one end 210A of the second coil pattern 200A, and a second via V2A may connect one end 210A of the second coil pattern 200A and one end 310A of the third coil pattern 300A.

According to an example embodiment, a case in which the first to third coil patterns 100A, 200A, and 300A included in the on-chip inductor 10A have the same shape will be described as an example. That is, a case in which the first to third coil patterns 100A, 200A, and 300A included in the on-chip inductor 10 according to an example embodiment have the same shape, line width, and thickness will be described as an example.

In this case, the equivalent circuit may be represented by FIGS. 8A and 8B. That is, when the first to third coil patterns 100A, 200A, and 300A of the on-chip inductor 10A of FIG. 7 rotate in the same rotation direction D11, D12, and D13, first to third inductors ID1, ID2, and ID3 connected in a T-type with a common node N3 may be represented by an equivalent circuit that positions of the dots of the first to third inductors ID1, ID2, and ID3 are disposed toward the common node N3 as shown in FIG. 8A, and an equivalent circuit that positions of the dots of the first to third inductors ID1, ID2, and ID3 disposed in an opposite direction of the common node N3 as shown in FIG. 8B.

Referring to FIG. 9, compared to the on-chip inductor 10A of FIG. 7, an on-chip inductor 10A' of FIG. 9 has a rotation direction D12' of a second coil pattern 200N opposite to rotation directions D11 and D13 of the first and third coil pattern 100A and 300A.

In this case, the equivalent circuit may be represented by FIGS. 10A and 10B. That is, the rotation direction D12' of the second coil pattern 200A' of the on-chip inductor 10N rotates in a direction opposite to the rotation directions D11 and D13 of the first and third coil patterns 100A and 300A, a dot of each of first to third inductors ID1, ID2, and ID3 connected in a T-type with a common node N4 as a center, may be represented by an equivalent circuit in which only a dot of the second inductor ID2 is disposed toward the common node N3 as shown in FIG. 10A, and an equivalent circuit only a dot of the second inductor ID2 is disposed toward the common node N3 disposed in a direction opposite to the common node N3 as show in FIG. 10B.

As set forth above, according to example embodiments of the present inventive concepts, an on-chip inductor having a relatively high inductance and occupying a relatively small area may be provided.

Herein, a lower side, a lower portion, a lower surface, and the like, are used to refer to a direction toward a mounting surface of the fan-out semiconductor package in relation to cross-sections of the drawings, while an upper side, an upper portion, an upper surface, and the like, are used to refer to an opposite direction. However, these directions are defined for convenience of explanation, and the claims are not particularly limited by the directions defined as described above.

The meaning of a "connection" of a component to another component in the description includes an indirect connection through an adhesive layer as well as a direct connection between two components. In addition, "electrically connected" conceptually includes a physical connection and a physical disconnection. It can be understood that when an element is referred to with terms such as "first" and "second," the element is not limited thereby. Such terms may be used only for a purpose of distinguishing the element from other elements, and may not limit the sequence or importance of the elements. In some cases, a first element may be referred to as a second element without departing from the scope of the claims set forth herein. Similarly, a second element may also be referred to as a first element.

The term "an example embodiment" and similar as used herein does not refer to the same single example embodiment, and is provided to emphasize a particular feature or characteristic different from that of one or more other example embodiments. Example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

Terms used herein are used only in order to describe example embodiments rather than limiting the present disclosure. In this case, singular forms include plural forms unless interpreted otherwise in context.

Various and advantageous advantages and effects of the present inventive concepts are not limited to the above description, as will be more readily understood in the process of describing the specific embodiments of the present inventive concepts.

While the example embodiments have been shown and described above, it will be apparent to those skilled in the art that modifications and variations could be made without departing from the scope of the present inventive concepts as defined by the appended claims.

What is claimed is:

1. An on-chip inductor, comprising:

a semiconductor substrate;

a plurality of insulating layers stacked over the semiconductor substrate;

first, second and third spiral-shaped coil patterns inductively coupled to each other and sequentially disposed on respective layers among the plurality of insulating layers, wherein the first, second and third spiral-shaped coil patterns have respective first ends overlapping each other;

a first via connecting the respective first ends of the first and second spiral-shaped coil patterns to each other; and a second via connecting the respective first ends of the second and third spiral-shaped coil patterns to each other, wherein the first and second vias overlap each other to form a common node electrically connecting the respective first ends of the first spiral-shaped coil pattern, the second spiral-shaped coil pattern, and the third spiral-shaped coil pattern in common to define a T-type configuration, and wherein respective second ends of the first spiral-shaped coil pattern, the second spiral-shaped coil pattern, and the third spiral-shaped coil pattern form a first signal terminal, a second signal terminal, and a third signal terminal that are electrically isolated from one another.

2. The on-chip inductor of claim 1, wherein the first, second, and third spiral-shaped coil patterns spiral outwardly from the respective first ends.

3. The on-chip inductor of claim 1, wherein the first, second, and third spiral-shaped coil patterns spiral in a same direction.

4. The on-chip inductor of claim 1, wherein at least one of the first and third spiral-shaped coil patterns spiral in a different direction relative to the second spiral-shaped coil pattern.

5. The on-chip inductor of claim 1, wherein the first, second, and third signal terminals do not overlap each other.

6. The on-chip inductor of claim 1, wherein each of the first, second, and third spiral-shaped coil patterns is a spiral inductor.

7. The on-chip inductor of claim 1, wherein the third spiral-shaped coil pattern is disposed at a level higher than that of the first and second spiral-shaped coil patterns, and a line width of the third spiral-shaped coil pattern is greater than a line width of the first spiral-shaped coil pattern and a line width of the second spiral-shaped coil pattern.

8. The on-chip inductor of claim 1, wherein the third spiral-shaped coil pattern is disposed at a level higher than that of the first and second spiral-shaped coil patterns, and a thickness of the third spiral-shaped coil pattern is greater than a thickness of the first spiral-shaped coil pattern and a thickness of the second spiral-shaped coil pattern.

9. The on-chip inductor of claim 1, wherein the first and second vias form the common node for connecting the respective first ends of the first, second, and third spiral-shaped coil patterns in common.

10. The on-chip inductor of claim 1, wherein the semiconductor substrate is a silicon on insulator (SOI) substrate.

11. An on-chip inductor, comprising:

a plurality of insulating layers;

at least three spiral-shaped coil patterns inductively coupled to each other and respectively disposed on the plurality of insulating layers, wherein the at least three spiral-shaped coil patterns have respective first ends aligned with each other in a vertical direction; and vias (i) penetrating through at least one insulating layer among the plurality of insulating layers to connect the respective first ends of the at least three spiral-shaped coil patterns to define a T-type configuration, and (ii) disposed to overlap each other, wherein respective second ends of the at least three spiral-shaped coil patterns form respective signal terminals that are electrically isolated from one another.

12. The on-chip inductor of claim 11, wherein the at least three spiral-shaped coil patterns spiral outwardly from the respective first ends.

13. The on-chip inductor of claim 11, wherein the plurality of insulating layers comprise at least three insulating layers.

14. The on-chip inductor of claim 11, wherein the plurality of insulating layers are stacked on a silicon on insulator (SOI) substrate.

15. The on-chip inductor of claim 11, wherein the vias form a common node for connecting the respective first ends of the at least three spiral-shaped coil patterns in common.

16. An on-chip inductor, comprising:

a semiconductor substrate;

a multilayer interconnection layer stacked on the semiconductor substrate in one direction;

first, second and third spiral-shaped coil patterns inductively coupled to each other and sequentially disposed on respective layers of the multilayer interconnection layer, wherein the first, second and third spiral-shaped coil patterns have respective first ends overlapping in the one direction;

a first via connecting the respective first ends of the first and second spiral-shaped coil patterns to each other; and a second via connecting the respective first ends of the second and third spiral-shaped coil patterns to each other, wherein the first and second vias are disposed to overlap in the one direction, and form a common node electrically connecting the respective first ends of the first, second, and third spiral-shaped coil patterns in common to define a T-type configuration, and wherein respective second ends of the first spiral-shaped coil pattern, the second spiral-shaped coil pattern, and the third spiral-shaped coil pattern form a first signal terminal, a second signal terminal, and a third signal terminal that are electrically isolated from one another.

17. The on-chip inductor of claim 16, wherein the first, second, and third spiral-shaped coil patterns spiral outwardly from the respective first ends.

18. The on-chip inductor of claim 16, wherein the first signal terminal, the second signal terminal, and the third signal terminal do not overlap each other.

19. The on-chip inductor of claim 16, wherein each of the first, second, and third spiral-shaped coil patterns is a spiral inductor.

* * * * *